United States Patent
Saito et al.

(10) Patent No.: US 9,463,809 B2
(45) Date of Patent: Oct. 11, 2016

(54) VEHICLE BODY VIBRATION CONTROL DEVICE FOR VEHICLE

(71) Applicant: TOYOTA JIDOSHA KABUSHIKI KAISHA, Toyota-shi, Aichi (JP)

(72) Inventors: Takashi Saito, Fuji (JP); Hirofumi Momose, Numazu (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 14/553,487

(22) Filed: Nov. 25, 2014

(65) Prior Publication Data

US 2015/0151743 A1    Jun. 4, 2015

(30) Foreign Application Priority Data

Nov. 29, 2013  (JP) .................................. 2013-248606

(51) Int. Cl.
*B60W 30/02*    (2012.01)
*B60W 50/06*    (2006.01)
*B60W 30/19*    (2012.01)
*B60W 50/08*    (2012.01)

(52) U.S. Cl.
CPC .............. *B60W 50/06* (2013.01); *B60W 30/19* (2013.01); *B60W 50/087* (2013.01); *B60W 2510/105* (2013.01)

(58) Field of Classification Search
CPC ........................... B60W 30/025; B60W 50/06
USPC ........................................................... 701/99
See application file for complete search history.

(56) References Cited

U.S. PATENT DOCUMENTS

2007/0005196 A1*   1/2007   Oikawa et al. .................. 701/1

FOREIGN PATENT DOCUMENTS

| JP | 2007-237879 A | 9/2007 |
| JP | 2007237881 A | 9/2007 |
| JP | 2010132254 A | 6/2010 |

OTHER PUBLICATIONS

Machine Translation (to English) of JP 2007-237879 published Sep. 2007.*

* cited by examiner

*Primary Examiner* — Anne Antonucci
(74) *Attorney, Agent, or Firm* — Sughrue Mion, PLLC

(57) ABSTRACT

Provided is a vehicle body vibration control device (10) for a vehicle, including a request driving force calculation unit (20) calculating a driver's request driving force, a driving unit (16) applying a driving force to a vehicle (12), a driving force control unit (22) controlling the driving unit based on a command driving force, a notch filter (24) receiving a signal indicating the request driving force, processing the signal so as to reduce a frequency component of vibration of a vehicle body, and outputting the processed signal to the driving force control unit as a signal indicating the command driving force, and a command driving force correction unit 30 correcting, when any one of a predetermined shifting operation and a predetermined changing operation for a vehicle traveling mode is performed, the command driving force to the driver's request driving force of the driver.

6 Claims, 4 Drawing Sheets

VEHICLE BODY VIBRATION CONTROL DEVICE FOR VEHICLE

BACKGROUND OF THE INVENTION

1. Field of the Invention

The present invention relates to a vehicle body vibration control device for a vehicle such as an automobile, and more particularly, to a vehicle body vibration control device configured to suppress vibration of a vehicle body, which is caused by fluctuation in driving force of the vehicle.

2. Description of the Related Art

Vehicles such as automobiles travel by a driving force generated by a driving unit such as an engine. Fluctuation in driving force generated from the driving unit causes loads to be applied on the vehicle body in a fore-and-aft direction and a vertical direction of the vehicle relative to wheels. Thus, pitching vibration occurs in the vehicle body. Therefore, it has been suggested that the pitching vibration of the vehicle body be reduced through appropriate control of a command driving force to the driving unit.

For example, Japanese Patent Application Laid-open No. 2007-237879 filed by the applicant of this application describes a vehicle body vibration control device configured based on the above-mentioned concept. This vehicle body vibration control device includes a request driving force calculation unit configured to calculate a driver's request driving force, a driving unit configured to apply a driving force to a vehicle, a driving force control unit configured to control the driving unit based on a command driving force, and a notch filter configured to receive a signal indicating the request driving force from the request driving force calculation unit. The notch filter has a notch frequency set to a value for reducing a frequency component of vibration of a vehicle body. The notch filter subjects the signal to filter processing, and outputs the processed signal to the driving force control unit as a signal indicating the command driving force.

According to the vehicle body vibration control device of this type, the signal indicating the driver's request driving force is processed by the notch filter, and the driving unit is controlled based on the command driving force reduced in frequency component of the vibration of the vehicle body. As a result, the pitching vibration of the vehicle body can be reduced.

The driver of the vehicle performs a shifting operation when trying to change the presence or absence of the vehicle driving force or to increase or decrease the driving force. The driver experiences a change of a vehicle speed or a change of an inertial force applied on the driver himself/herself, to thereby confirm a change of the vehicle driving force as expected to be achieved through the shifting operation (moderation feeling concerning driving force).

However, when the signal indicating the request driving force is processed by the notch filter to reduce the vibration of the vehicle body, the driver's request driving force is smoothed through the filter processing to generate the command driving force. Consequently, responsiveness of the driving force of the vehicle to the request driving force is reduced. For example, during acceleration, in other words, during increase of the request driving force, the command driving force is controlled to a smaller side compared to the request driving force. Conversely, during deceleration, in other words, during decrease of the request driving force, the command driving force is controlled to a larger side compared to the request driving force. Thus, the driver experiences a change of the vehicle speed or a change of the inertial force different from that expected to be achieved through the shifting operation. As a result, the driver may feel uncomfortable.

Depending on the vehicles, the driver may select a vehicle traveling mode through a switching operation or the like. For example, as vehicle traveling modes, there are a normal mode in which the responsiveness of the driving force is set to normal responsiveness, a power mode in which the responsiveness of the driving force is set to high responsiveness, and an eco-mode in which the responsiveness of the driving force is set to moderate responsiveness. Even when the traveling mode of the vehicle is changed, the driver expects responsiveness of the vehicle driving force corresponding to the change. However, when the driving force is processed through the notch filter, the driver experiences a change of the vehicle speed or a change of the inertial force different from that expected to be achieved through the changing operation for the traveling mode. As a result, the driver may feel uncomfortable.

SUMMARY OF THE INVENTION

It is a main object of the present invention to reduce, while suppressing the vibration of the vehicle body as effectively as possible, a risk of experience of uncomfortable feeling caused by a delay of a change of a driving force when the driver performs the shifting operation or the changing operation for the traveling mode.

The present invention, according to one embodiment thereof, provides a vehicle body vibration control device for a vehicle, including: a request driving force calculation unit configured to calculate a request driving force of a driver; a driving unit configured to apply a driving force to the vehicle; a driving force control unit configured to control the driving unit based on a command driving force; a notch filter configured to receive a signal indicating the request driving force from the request driving force calculation unit, subject the signal to filter processing, and output the signal subjected to the filter processing to the driving force control unit as a signal indicating the command driving force, the notch filter having a notch frequency set to a value for reducing a frequency component of vibration of a vehicle body; and a command driving force correction unit configured to correct, when the driver performs any one of a predetermined shifting operation and a predetermined changing operation for a vehicle traveling mode, the command driving force to a value closer to the request driving force of the driver than to the command driving force.

According to the above-mentioned configuration, the signal indicating the request driving force is processed by the notch filter having the notch frequency set to the value for reducing the frequency component of the vibration of the vehicle body, and the processed signal is output to the driving force control unit as the signal indicating the command driving force. When the driver performs any one of the predetermined shifting operation and the predetermined changing operation for the vehicle traveling mode, the command driving force is corrected to the value closer to the request driving force of the driver than to the command driving force. In this case, the "value closer to the request driving force of the driver than to the command driving force" is a concept that encompasses the request driving force of the driver.

Accordingly, when any one of the predetermined shifting operation and the predetermined changing operation for the vehicle traveling mode is performed, a smoothing degree of the driver's request driving force during the generation of the command driving force through the filter processing can be reduced. This enables less reduction of responsiveness of the driving force of the vehicle to the request driving force. As a result, according to the present invention, the driver can more easily experience a change of acceleration of the vehicle or an inertial force applied to the driver himself/ herself corresponding to the shifting operation as compared to where the command driving force is not corrected. Thus, the risk of experience of the driver's uncomfortable feeling due to the reduction of the responsiveness of the vehicle driving force can be reduced.

Also, when the notch degree of the notch filter is set lower, the risk of experience of the driver's uncomfortable feeling due to the reduction of the responsiveness of the vehicle driving force can be reduced. However, in that case, the effect of reducing the frequency component of the vibration of the vehicle body through the notch filter, in other words, a vehicle body damping effect, is inevitably reduced.

On the contrary, according to the above-mentioned configuration, the notch degree of the notch filter is not set lower, and thus the effect of reducing the frequency component of the vibration of the vehicle body through the notch filter is not reduced. As a result, while securing the vehicle body damping effect as high as possible, the risk of experience of the driver's uncomfortable feeling when the shift changing operation or the changing operation for the vehicle traveling mode is performed can be reduced.

Further, according to one embodiment of the present invention, in the above-mentioned configuration, the command driving force correction unit may be configured to correct the command driving force to the request driving force of the driver.

In the above-mentioned configuration, when the driver performs any one of the shifting operation and the changing operation for the vehicle traveling mode, the command driving force is corrected to a value equal to the request driving force of the driver, in other words, a value when the filter processing is not performed through the notch filter. Accordingly, an influence of the filter processing can be reduced as compared to, for example, where the command driving force is corrected to a value closer to a command driving force generated through the filter processing than to the request driving force of the driver. As a result, the risk of experience of the driver's uncomfortable feeling can be reduced more effectively as compared to where the command driving force is corrected to a value other than the request driving force of the driver.

Further, according to one embodiment of the present invention, in the above-mentioned configuration, the predetermined shifting operation may be a shifting operation to be performed between a shift position where the driving force is applied to the vehicle and a shift position where no driving force is applied to the vehicle.

In general, a change of the vehicle driving force along with the shifting operation is more significant when a shift changing operation for changing whether or not to apply the driving force to the vehicle is performed than when a shift changing operation is performed between shift positions where the driving force is applied to the vehicle. Thus, a necessity of correcting the command driving force is more significant when the shifting operation for changing whether or not to apply the driving force to the vehicle is performed.

According to the above-mentioned configuration, the predetermined shifting operation is the shifting operation to be performed between the shift position where the driving force is applied to the vehicle and the shift position where no driving force is applied to the vehicle. Thus, when the shifting operation for changing whether or not to apply the driving force to the vehicle is performed, the risk of experience of the driver's uncomfortable feeling can be reduced effectively.

According to one embodiment of the present invention, in the above-mentioned configuration, the predetermined changing operation for the vehicle traveling mode may be a changing operation for the vehicle traveling mode, which involves a change of responsiveness of the driving force of the vehicle to a driving operation performed by the driver.

When the responsiveness of the driving force of the vehicle to the driving operation performed by the driver does not change even through the changing operation for the vehicle traveling mode, the risk of experience of the driver's uncomfortable feeling is low, and thus there is no need to correct the command driving force. On the other hand, when the responsiveness of the driving force of the vehicle to the driving operation performed by the driver changes through the changing operation for the vehicle traveling mode, it is preferred to correct the command driving force so as to reduce the risk of experience of the driver's uncomfortable feeling.

In the above-mentioned configuration, the predetermined changing operation for the vehicle traveling mode is the changing operation for the vehicle traveling mode, which involves the change of the responsiveness of the driving force of the vehicle to the driving operation performed by the driver. As a result, when the changing operation for the vehicle traveling mode, which involves the change of the responsiveness of the driving force of the vehicle to the driving operation performed by the driver, is performed, the risk of experience of the driver's uncomfortable feeling can be effectively reduced by correcting the command driving force.

DETAILED DESCRIPTION OF THE PREFERRED EMBODIMENTS

Now, exemplary embodiments of the present invention are described in detail referring to the accompanying drawings.

Figure 1:
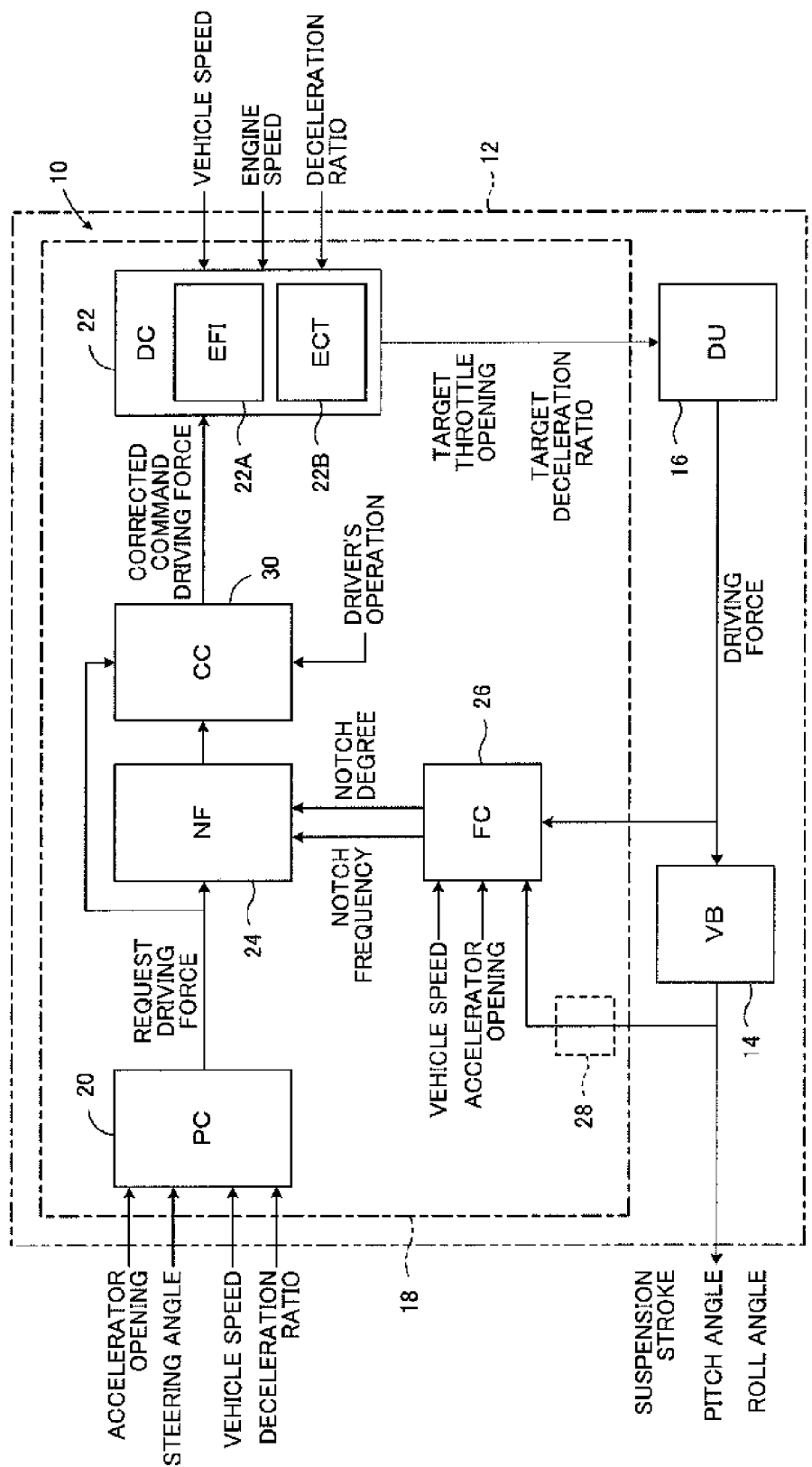
FIG. 1 is a block diagram illustrating a vehicle body vibration control device for a vehicle according to an embodiment of the present invention, which is applied to a rear-wheel-drive vehicle including an engine and a transmission in combination as a driving unit.

FIG. 1 is a block diagram illustrating a vehicle body vibration control device 10 for a vehicle according to an embodiment of the present invention. In FIG. 1, the vehicle body vibration control device 10 is mounted on a vehicle 12, and includes a vehicle body (VB) 14, a driving unit (DU) 16 configured to apply a driving force to the vehicle 12 including the vehicle body 14, and an electronic control unit (ECU) 18 configured to control the driving unit 16. In the illustrated embodiment, the driving unit 16 includes an engine and a transmission (gear type automatic transmission, continuously variable transmission, or dual clutch transmission) in combination. However, the driving unit 16 may be another driving unit such as a hybrid system or an electric motor. The electronic control unit 18 may be an arbitrary electronic control unit having a calculation function and a storage function, for example, as in the case of a microcomputer.

The electronic control unit 18 includes a request driving force calculation block (PC) 20 configured to calculate a driver's request driving force, and a driving force control block (DC) 22 configured to output a signal for controlling a driving force to the driving unit 16. Signals indicating an accelerator opening and a steering angle, which correspond to a driver's steering operation amount, and signals indicating a vehicle speed and a deceleration ratio of the transmission, which correspond to parameters indicating a driving state of the vehicle, are input to the request driving force calculation block 20. The request driving force calculation block 20 calculates a driver's request driving force based on the accelerator opening, the steering angle, the vehicle speed, and the deceleration ratio, or another arbitrary driving force calculation input parameter in addition to those parameters.

A signal indicating the driver's request driving force is input to a notch filter (NF) 24. The notch filter 24 suppresses or blocks transmission of a notch frequency component among frequency components included in the signal indicating the request driving force to reduce the notch frequency component. In this case, the notch frequency is basically set to a resonance frequency of the vehicle body. The signal indicating the request driving force (command driving force) corrected through processing of the notch filter 24 is input through a command driving force correction block (CC) 30 to the driving force control block 22. The command driving force correction block 30 is described later in detail referring to FIG. 2.

Pitch damping of the vehicle body through the notch filter 24 is filter processing represented by a transfer function H(s) in Expression (1), where $\zeta_p$ denotes a pitch damping ratio, $\zeta_m$ denotes a sum of the pitch damping ratio $\zeta_p$ and a control damping ratio $\zeta_k$, $\omega_p$ denotes a pitch natural frequency, and s denotes a Laplace operator.

$$H(s) = \frac{s^2 + 2\zeta_p \omega_p s + \omega_p^2}{s^2 + 2\zeta_m \omega_p s + \omega_p^2} \quad (1)$$

The filter processing represented by the transfer function in Expression (1) is represented by Expression (2) in terms of discrete-time expression, where $y_n$ and $x_n$ respectively denote an output value and an input value, $x_{n-1}$ and $x_{n-2}$ respectively denote a last input value and an input value before the last input value, and $y_{n-1}$ and $y_{n-2}$ respectively denote a last output value and an output value before the last output value.

$$y_n = a_n x_n + a_{n-1} x_{n-1} + a_{n-2} x_{n-2} - b_{n-1} y_{n-1} - b_{n-2} y_{n-2} \quad (2)$$

The filter coefficients $a_n$, $a_{n-1}$, $a_{n-2}$, $b_{n-1}$, and $b_{n-2}$ in Expression (2) are represented as follows.

$$a_n = \frac{\omega_p^2 T^2 + 4\zeta_p \omega_p T + 4}{c}$$

$$a_{n-1} = \frac{2\omega_p^2 T^2 - 8}{c}$$

$$a_{n-2} = \frac{\omega_p^2 T^2 - 4\zeta_p \omega_p T + 4}{c}$$

$$b_{n-1} = \frac{2\omega_p^2 T^2 - 8}{c} = a_{n-1}$$

$$b_{n-2} = \frac{\omega_p^2 T^2 - 4\zeta_m \omega_p T + 4}{c}$$

$$c = \omega_p^2 T^2 + 4\zeta_m \omega_p T + 4$$

The driving force control block 22 includes an electronic fuel injection (EFI) system control unit 22A and an electronic control transmission (ECT) control unit 22B. The driving force control block 22 determines a target throttle opening degree and a target deceleration ratio based on the parameters of the command driving force, the vehicle speed, an engine revolution number, and a deceleration ratio, and the driving force control block 22 outputs signals indicating those target throttle opening and target deceleration ratio to the driving unit 16.

The engine is controlled based on the target throttle opening, and the transmission is controlled based on the target deceleration ratio. Accordingly, the driving unit 16 applies a driving force corresponding to the command driving force to the vehicle 12 including the vehicle body 14. When the driving force is applied to the vehicle 12 and fluctuates, the vehicle body 14 of the vehicle vibrates. In particular, vibration such as pitching vibration or rolling vibration of the vehicle body appears as a change in suspension stroke, pitch angle, or roll angle.

A signal indicating the driving force applied to the vehicle 12 by the driving unit 16, and a signal indicating the change in suspension stroke, pitch angle, or roll angle, which occurs in the vehicle body due to the driving force, are input to a notch filter control block (FC) 26. The notch filter control block 26 variably controls a notch frequency of the notch filter 24. Specifically, the notch filter control block 26 calculates an amplitude distribution of pitching vibration or rolling vibration of the vehicle body with respect to a frequency of the command driving force on the basis of the correspondence between the frequency of the command driving force and vibration of the vehicle body 14, in particular, the pitching vibration or the rolling vibration of the vehicle body. Then, the notch filter control block 26 controls the notch frequency so as to minimize amplitude of the pitching vibration or the rolling vibration of the vehicle body.

For example, the notch filter control block 26 performs frequency analysis by a Fourier transform method for response motion of the vehicle body to a driving force applied to the vehicle in various driving states of the vehicle. Then, the notch filter control block 26 calculates an amplitude distribution of the pitching vibration or the rolling vibration of the vehicle body with respect to the frequency of the command driving force, and controls the notch frequency so as to minimize the amplitude thereof.

In this case, a signal indicating the pitching or the rolling of the vehicle body, which is input to the notch filter control block 26, may be subjected to low-pass filter processing by a low-pass filter as indicated by a broken-line block 28 of FIG. 1. Through the low-pass filter processing, vehicle body vibration of a relatively low frequency of about 1 Hz to 2 Hz, which is easily generated by resonance along with a change in driving operation amount such as the accelerator opening or the steering angle, is efficiently extracted. As a result, the notch frequency can be more accurately controlled.

The control itself of the notch frequency of the notch filter 24 is not a main subject of the present invention. Accordingly, the notch frequency may be calculated through an arbitrary procedure as long as the notch frequency is calculated to a value, for example, corresponding to a resonance frequency of the vehicle body so as to effectively reduce the pitching vibration or the rolling vibration of the vehicle body. For example, as another control procedure, a procedure described in paragraphs [0036] to [0036] of Japanese Patent Application Laid-open No. 2007-237879 filed by the applicant of this application may be used.

The notch filter 24 has its notch frequency controlled by the notch filter control block 26, and a notch degree of the notch filter 24, in other words, an attenuation degree of a component of the notch frequency is controlled depending on increase or decrease of the driver's request driving force, therefore, depending on whether the driver's request is acceleration or deceleration. Notably, the increase or decrease of the driver's request driving force may be determined based on increase or decrease of the accelerator opening. The control of the notch degree based on whether the driver's request is acceleration or deceleration is not a main subject of the present invention. Thus, the notch degree may be calculated through an arbitrary procedure, or set to a fixed value.

Figure 3:
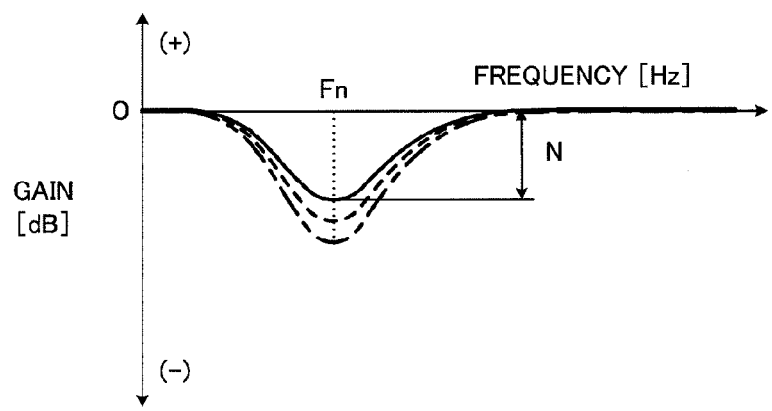
FIG. 3 is a graph showing an example of frequency characteristics of the notch filter, in other words, a relationship between a frequency and a gain.

FIG. 3 shows frequency characteristics of the notch filter 24, in which Fn denotes a notch frequency. As can be understood from FIG. 3, a notch degree N indicates a depth of a V-shaped notch in the frequency characteristics. As the notch degree is higher, an attenuation degree of a driver's request driving force in the notch frequency is higher.

Figure 2:
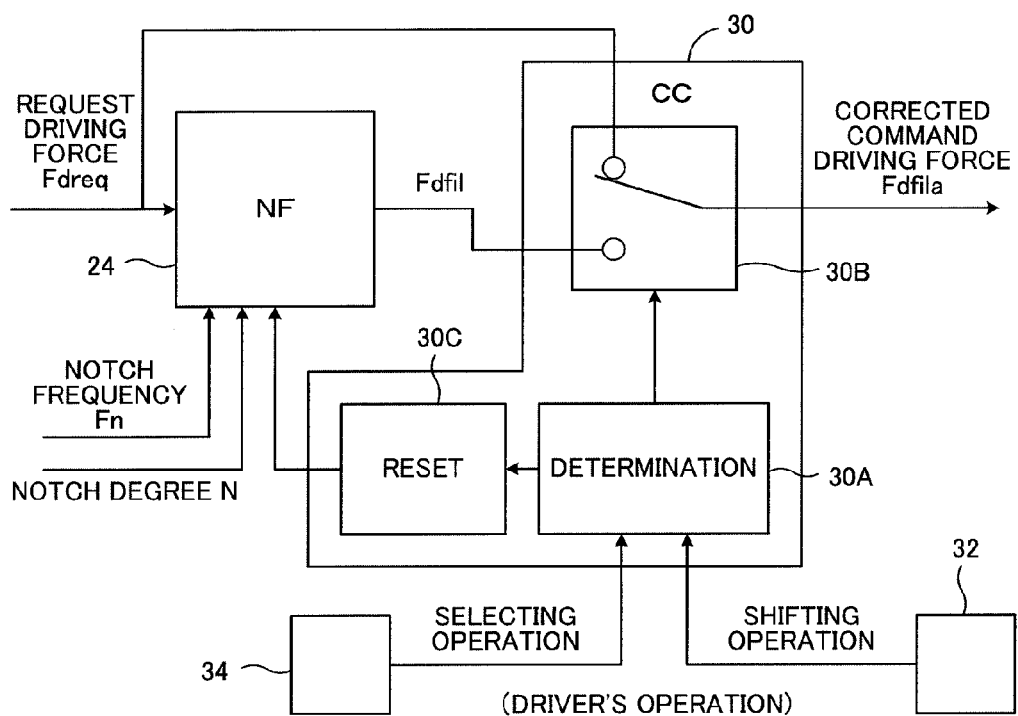
FIG. 2 is a block diagram illustrating a notch filter and a command driving force correction block according to the embodiment of the present invention.

As illustrated in FIG. 2, the command driving force correction block 30 includes a determination block 30A, a switching block 30B, and a reset block 30C. A signal indicating a driver's shifting operation (shift position and its change) is input to the determination block 30A from a shift position sensor 32, and a signal indicating a driver's traveling mode selecting operation (vehicle traveling mode and its change) is input to the determination block 30A from a traveling mode selection switch 34.

The shift position may be a neutral position or a parking position where the vehicle driving force does not change even when the driver performs a driving operation to increase or decrease the accelerator opening, or a drive position or the like where the vehicle driving force changes when the driver performs the driving operation. The vehicle traveling mode may be a normal mode in which responsiveness of the driving force is set to normal responsiveness, a power mode in which the responsiveness of the driving force is set to high responsiveness, an eco-mode in which the responsiveness of the driving force is set to moderate responsiveness, and the like.

The determination block 30A determines whether or not the shift position has changed between the shift position where the vehicle driving force does not change and the shift position where the vehicle driving force may change based on information about the driver's shifting operation. The determination block 30A determines whether or not the traveling mode has changed based on information about the driver's traveling mode selecting operation. When the determination block 30A determines that the shift position or the traveling mode has changed, the block 30A determines that correction of the command driving force needs to be stopped, and outputs, to the switching block 30B, a command to set a corrected command driving force Fdfila to a request driving force Fdreq.

When the switching block 30B has not received, from the determination block 30A, any command to set the corrected command driving force Fdfila to the request driving force Fdreq, the switching block 30B outputs a command driving force Fdfil to the driving force control block 22 as the corrected command driving force Fdfila. On the other hand, when the switching block 30B has received, from the determination block 30A, the command to set the corrected command driving force Fdfila to the request driving force Fdreq, the switching block 30B outputs the request driving force Fdreq to the driving force control block 22 as the corrected command driving force Fdfila.

In a situation where the correction of the command driving force is stopped, when a condition for ending the stop of the correction of the command driving force is satisfied, the determination block 30A outputs a command to reset the notch filter 24 to the reset block 30C. After the reception of the reset command, as described later in detail, the reset block 30C resets the notch filter to set a state enabling the notch filter 24 to perform filter processing without any influence of past data.

As apparent from the above description, the request driving force calculation block 20, the driving force control block 22, and the command driving force correction block 30 respectively function as a request driving force calculation unit, a driving force control unit, and a command driving force correction unit of the present invention. The functions of those blocks and the notch filter 24 are achieved under control of the electronic control unit 18. For example, each function is achieved by a calculation control unit such as a microcomputer constructing the electronic control unit 18 in accordance with a control program.

Figure 4:
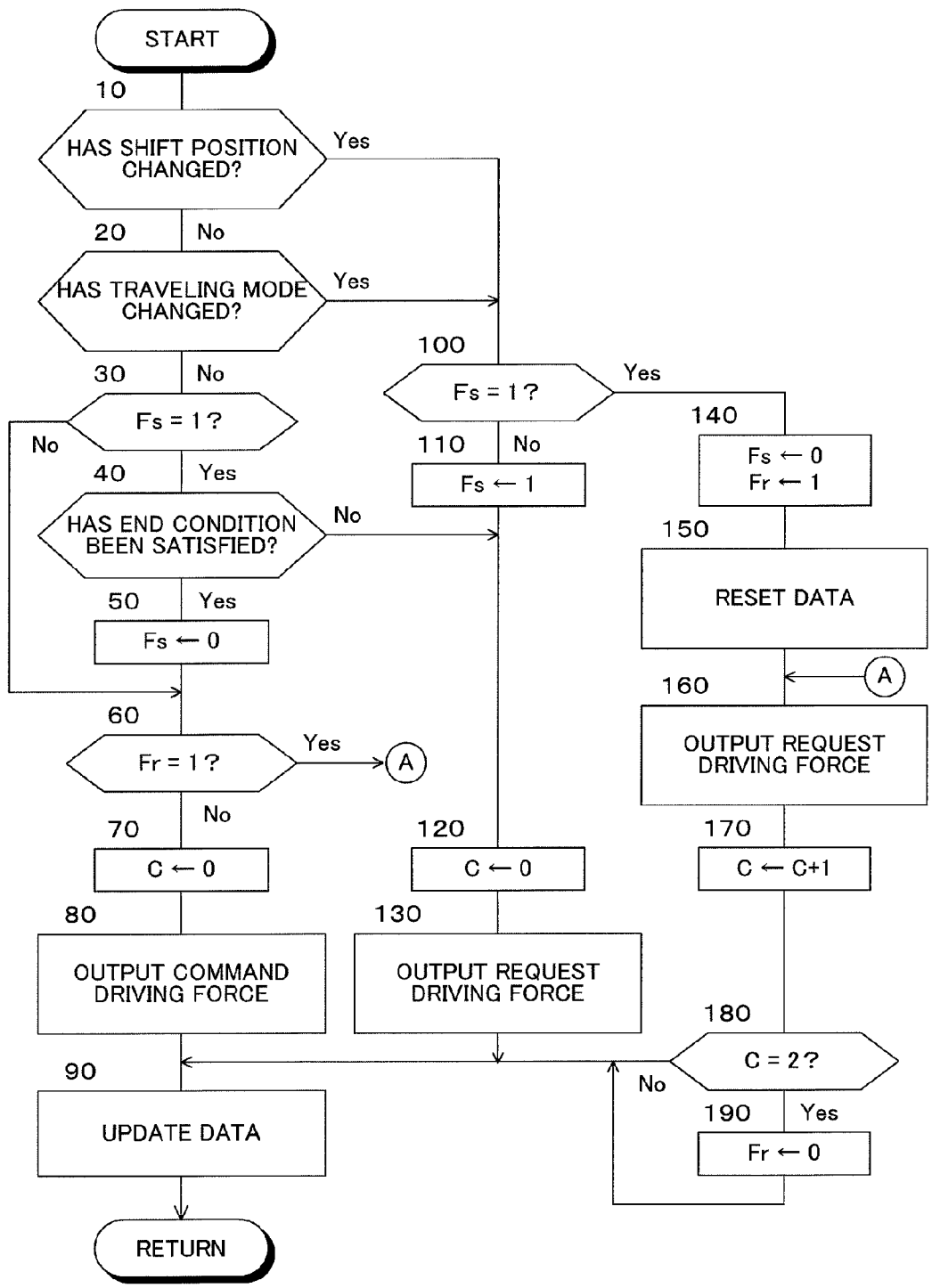
FIG. 4 is a flowchart illustrating an example of a command driving force correction and notch filter resetting routine according to the embodiment of the present invention.

FIG. 4 is a flowchart illustrating an example of a command driving force correction and notch filter resetting routine executed by the command driving force correction block 30. Control executed in accordance with the flowchart illustrated in FIG. 4 is started by turning ON an ignition switch (not shown), and is repeatedly executed at each predetermined time interval. In the description of the flowchart illustrated in FIG. 4, the control processing executed in accordance with the flowchart is simply referred to as control.

First, in Step 10, determination is made as to whether or not the shift position has changed between a shift position where no driving force is applied to the vehicle and a shift position where the driving force is applied to the vehicle. When the determination is positive (YES), the control processing proceeds to Step 100. When the determination is negative (NO), the control processing proceeds to Step 20.

Prior to Step 10, a flag Fs for determining whether or not to stop the correction of the command driving force, a flag Fr for determining whether or not control for resuming the filter processing is currently executed, and a count value C of the number of times of control executed after a start of the resumption of the filter processing are reset to 0.

In Step 20, determination is made as to whether or not the vehicle traveling mode has changed. When the determination is positive (YES), the control processing proceeds to Step 100. When the determination is negative (NO), the control processing proceeds to Step 30.

In Step 30, determination is made as to whether or not the flag Fs is 1, in other words, whether or not to stop the filter processing. When the determination is negative (NO), the control processing proceeds to Step 60. When the determination is positive (YES), the control processing proceeds to Step 40.

In Step 40, determination is made as to whether or not to end the stop of the correction of the command driving force, in other words, whether or not to return the command driving force to be output to the driving force control block 22 to the command driving force Fdfil. When the determination is negative (NO), the control processing proceeds to Step 120. When the determination is positive (YES), in Step 50, the flag Fs is reset to 0, and then the control processing proceeds to Step 60.

With the elapse of a predetermined time period after the stop of the correction of the command driving force, it may be determined that the stop of the correction of the command driving force needs to be ended. For example, the elapse of a predetermined time period may be determined when a degree of a difference between the command driving force Fdfil and the request driving force Fdreq is equal to or less than a positive reference value in a situation where the flag Fs is set to 1.

In Step 60, determination is made as to whether or not the flag Fr is 1, in other words, whether or not the control for resuming the filter processing is currently executed. When the determination is positive (YES), the control processing proceeds to Step 160. When the determination is negative (NO), in Step 70, the count value C is reset to 0, and then the control processing proceeds to Step 80.

In Step 80, a signal indicating a value of the command driving force Fdfil, in other words, a value generated by subjecting the request driving force Fdreq to the filter processing, is output to the driving force control block 22 as the corrected command driving force Fdfila.

In Step 90, data used for the filter processing is updated for a next round of control. Specifically, the input values $x_n$ and $x_{n-1}$ in Expression (2) are respectively rewritten to $x_{n-1}$ and $x_{n-2}$.

In Step 100, determination is made as to whether or not the flag Fs is 1. When the determination is positive (YES), the control processing proceeds to Step 140. When the determination is negative (NO), in Step 110, the flag Fs is set to 1, and in Step 120, the count value C is reset to 0. Then, the control processing proceeds to Step 130.

In Step 130, a signal indicating the request driving force Fdreq is output to the driving force control block 22 as the corrected command driving force Fdfila. Then, the control processing proceeds to Step 90.

In Step 140, the flag Fs is reset to 0, and the flag Fr is set to 1.

In Step 150, data used for the filter processing is reset. Specifically, the input values $x_{n-1}$ and $x_{n-2}$ and the output values $y_{n-1}$ and $y_{n-2}$ in Expression (2) are all rewritten to $x_n$ and $y_n$, respectively.

In Step 160, as in the case of Step 130, a signal indicating the request driving force Fdreq is output to the driving force control block 22 as the command driving force. In next Step 170, the count value C is incremented by 1.

In Step 180, determination is made as to whether or not the count value C is 2, in other words, whether or not to end the control for resuming the filter processing. When the determination is negative (NO), the control processing proceeds to Step 90. When the determination is positive (YES), in Step 190, the flag Fr is reset to 0, and then the control processing proceeds to Step 90.

Next, various cases of correction of the command driving force and resetting of the notch filter according to the embodiment thus configured as described above are described.

<When there is No Change in Shift Position or Vehicle Traveling Mode>

In this case, negative determination is made in Steps 10 and 20, and negative determination is made in Steps 30 and 60. Accordingly, in Step 80, the signal indicating the command driving force Fdfil is output to the driving force control block 22 as the corrected command driving force Fdfila. As a result, normal vehicle body damping control is executed by the vehicle body vibration control device 10.

<Immediately after Change of Shift Position or Traveling Mode>

In this case, positive determination is made in Step 10 or 20, and negative determination is made in Step 100. In step 110, the flag Fs is set to 1. In step 120, the count value C is reset to 0. In Step 130, the signal indicating the request driving force Fdreq is output to the driving force control block 22 as the corrected command driving force Fdfila. As a result, the vehicle body damping control is not executed by the vehicle body vibration control device 10.

Therefore, the vehicle driving force is not affected by the filter processing of the notch filter 24, and thus reduction of responsiveness of the vehicle driving force due to the filter processing is prevented. Accordingly, as compared to where the normal vehicle body damping control is executed, the driver can more easily experience a change of acceleration or an inertial force of the vehicle corresponding to the shifting operation or the changing operation for the traveling mode. As a result, the risk of experience of the driver's uncomfortable feeling due to the reduction of the responsiveness of the vehicle driving force can be reduced.

<When End Condition is not Satisfied while there is No Change in Shift Position or Traveling Mode>

In this case, negative determination is made in Steps 10 and 20, but positive determination is made in Step 30. Step 130 is executed based on the negative determination in Step 40.

Accordingly, as in the section of <Immediately after change of shift position or traveling mode>, the vehicle body damping control is not executed by the vehicle body vibration control device 10. As a result, the risk of experience of the driver's uncomfortable feeling due to the reduction of the responsiveness of the vehicle driving force can be continuously reduced.

Figure 5:
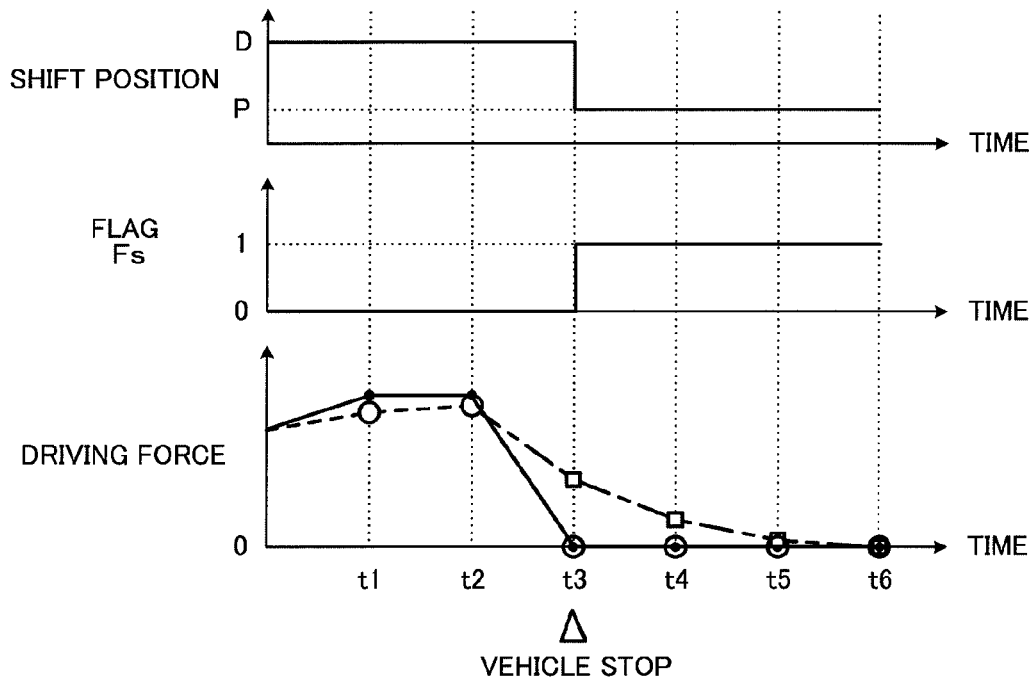
FIG. 5 is a time chart illustrating an operation of the embodiment of the present invention when a shift position is switched from a drive position to a parking position as compared to an operation of a related-art vehicle body vibration control device.

For example, FIG. 5 is a time chart illustrating an operation of the embodiment of the present invention when the shift position is switched from the drive position to the parking position as compared to an operation of a related-art vehicle body vibration control device. In FIG. 5, the black dot indicates the driver's request driving force Fdreq, and the solid line indicates a change of the request driving force Fdreq. The white circle indicates the corrected command driving force Fdfila in the embodiment of the present invention, and the broken line indicates a change of the corrected command driving force Fdfila. The square indicates the command driving force Fdfil, and the alternate long and short dashed line indicates a change of the command driving force Fdfil.

As illustrated in FIG. 5, it is supposed that there are driver's driving requests at time points t1 and t2 and, at a time point t3, a shifting operation is performed from a drive (D) position to a parking (P) position, and the request driving force Fdreq is lowered to 0 so as to stop the vehicle.

It is further supposed that at the time point t3 and later, the request driving force Fdreq is 0, and the stopped state of the vehicle continues.

The command driving force Fdfil at the time point t3 is calculated based on the request driving forces Fdreq and the command driving forces Fdfil at the time points t1 and t2, and thus calculated to a value larger than 0. Similarly, the command driving force Fdfil at a time point t4 is calculated based on the request driving forces Fdreq and the command driving forces Fdfil at the time points t2 and t3, and thus calculated to a value larger than 0. The command driving force Fdfil at a time point t5 is calculated based on the request driving forces Fdreq and the command driving forces Fdfil at the time points t3 and t4, and thus calculated to a value larger than 0.

Thus, in the case of the related-art vehicle body vibration control device in which the command driving force Fdfil is not corrected even when the shifting operation is performed, even at the time point t3 and later when the vehicle is in the stopped state and the request driving force Fdreq is 0, the vehicle driving force is not set to 0 but to a positive value. Thus, when a function of transmitting the driving force to the transmission remains, a creep force is applied to the vehicle. As a result, the driver feels uncomfortable.

On the contrary, according to the embodiment of the present invention, the command driving force at the time point t3 and later is corrected to the corrected command driving force Fdfila, and the corrected command driving force Fdfila is set to the request driving force Fdreq, which is 0. Thus, the vehicle driving force is 0. No creep force is applied to the vehicle, and as a result, any uncomfortable feeling due to the remaining driving force is not generated.

FIG. 5 illustrates the exemplary case where the shift position is switched from the drive position to the parking position. However, even when the shift position is switched from the drive position to a neutral position or when the shift position is switched from the parking position to the drive position, similar actions and effects can be provided. In other words, even when an arbitrary shifting operation is performed between the shift position where the driving force is applied to the vehicle and the shift position where no driving force is applied to the vehicle, similar actions and effects can be provided. Moreover, even when a changing operation for the vehicle traveling mode, which involves a change of the responsiveness of the vehicle driving force to the driver's driving operation, is performed, similar actions and effects can be provided.

<When End Condition is Satisfied while there is No Change in Shift Position or Traveling Mode>

In this case, negative determination is made in Steps 10 and 20, and positive determination is made in Steps 30 and 40. After resetting of the flag Fs to 0 in Step 50, negative determination is made in Step 60. Accordingly, after resetting of the count value C to 0 in Step 70, Step 80 is executed.

Accordingly, as long as the shift position or the vehicle traveling mode does not change, as in the section of <When there is no change in shift position or vehicle traveling mode>, the normal vehicle body damping control is executed by the vehicle body vibration control device 10.

<When Shift Position or Traveling Mode Changes Before End Condition is Satisfied>

In this case, positive determination is made in Step 10 or 20, and positive determination is made in Step 100. In step 140, the flag Fs is reset to 0, and the flag Fr is set to 1. Then, in Step 150, the data used for the filter processing is reset. In Step 160, the signal indicating the request driving force Fdreq is output to the driving force control block 22 as the corrected command driving force Fdfila. Thus, the vehicle body damping control is not executed by the vehicle body vibration control device 10.

Thus, when the shift position or the vehicle traveling mode changes in a situation where the normal vehicle body damping control is executed, the vehicle driving force can be controlled based on the driver's request driving force Fdreq without any influence of the past data over three cycles.

After the count value C has been incremented by 1 in Step 170 and the count value C has been determined to be 2 in Step 180, in Step 190, the flag Fr is reset to 0, and then the control processing proceeds to Step 90. Accordingly, as long as the shift position or the vehicle traveling mode does not change, as in the section of <When there is no change in shift position or vehicle traveling mode>, the normal vehicle body damping control is executed by the vehicle body vibration control device 10.

In particular, in the embodiment of the present invention, in Steps 130 and 160, the signal indicating the request driving force Fdreq is output to the driving force control block 22 as the corrected command driving force Fdfila. Thus, the vehicle driving force is not affected by the filter processing of the notch filter 24. As a result, as compared to where a value closer to the request driving force Fdreq than to the command driving force Fdfil but larger than the request driving force Fdreq is set as the corrected command driving force Fdfila, the risk of experience of the driver's uncomfortable feeling due to the reduction of the responsiveness of the vehicle driving force can be reduced more effectively.

The specific embodiment of the present invention is described in detail above. However, the present invention is not limited to the above-mentioned embodiment. It is apparent for those skilled in the art that various other embodiments may be employed within the scope of the present invention.

For example, in the above-mentioned embodiment, the correction of the command driving force to the value closer to the driver's request driving force than to the command driving force is achieved by correcting the command driving force generated through the filter processing. However, when a predetermined shifting operation or a predetermined changing operation for the vehicle traveling mode is performed, the correction may be achieved by lowering the notch degree of the notch filter 24 and calculating the command driving force to a value closer to the driver's request driving force than to the command driving force when the notch degree is not lowered.

In the above-mentioned embodiment, when the predetermined shifting operation or the predetermined changing operation for the vehicle traveling mode is performed, the corrected command driving force Fdfila is set to the driver's request driving force Fdreq. However, the corrected command driving force Fdfila may be set to a value other than the request driving force as long as the value is closer to the driver's request driving force than to the command driving force. For example, as the value other than the request driving force, there may be used a simple average value or a weighted average value of the command driving force Fdfil and the request driving force Fdreq, or a sum of Ka(Fdfil−Fdreq)+Fdreq, which is obtained by adding the request driving force to a value obtained by multiplying a difference between the command driving force Fdfil and the request driving force Fdreq by a coefficient Ka larger than 0 and smaller than 1.

In the above-mentioned embodiment, in Step 10, determination is made as to whether or not the shift position has changed. In Step 20, determination is made as to whether or not the vehicle traveling mode has changed. After positive determination has been made in Step 10 or 20, the control processing proceeds to Step 100. However, the determination of one of Steps 10 and 20 may be omitted.

In the above-mentioned embodiment, after positive determination has been made in Step 10 or 20 and positive determination has similarly been made in Step 100, in Step 150, the data used for the filter processing is reset. However, Step 150 may be omitted. In such a case, Steps 70, 100, 120, and 140 to 190 may be omitted.

In the above-mentioned embodiment, the command driving force correction block 30 operates between the notch filter 24 and the driving force control block 22 to switch the corrected command driving force Fdfila to the command driving force Fdfil or the request driving force Fdreq. However, the command driving force correction block 30 may operate on a side opposite to the driving force control block 22 with respect to the notch filter 24 to switch inputting of the request driving force Fdreq to the notch filter 24 and to the driving force control bock 22 (a modified example).

According to the embodiment of the present invention, the notch filter 24 can continue calculation of the filter processing irrespective of switching of the command driving force correction block 30. Thus, the responsiveness of the vehicle driving force when the request driving force Fdreq is increased or decreased can be set higher than in a case of the modified example.

Figure 6:
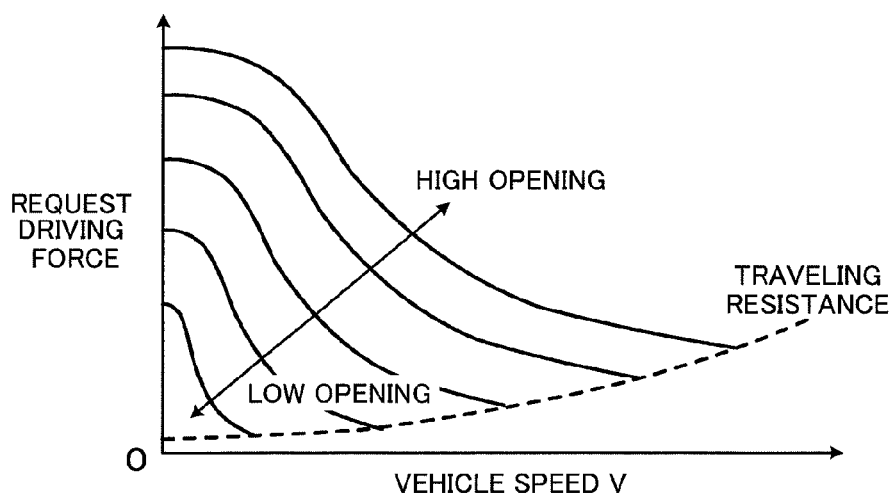
FIG. 6 is a map for calculating a driver's request driving force based on a vehicle speed and an accelerator opening.

In the above-mentioned embodiment, the driver's request driving force is estimated based on the accelerator opening. However, correction may be performed in such a manner that the driver's request driving force is calculated from a map illustrated in FIG. 6 based on the vehicle speed and the accelerator opening. In FIG. 6, a high opening and a low opening respectively mean a large accelerator opening and a small accelerator opening.

In the above-mentioned embodiment, the driving unit 16 includes the engine and the transmission in combination, and signals indicating a target throttle opening and a target deceleration ratio calculated based on the command driving force or the like are output to the driving unit 16. However, when the vehicle body vibration control device of the present invention is applied to a vehicle having a hybrid system mounted thereon, outputs of an engine and an electric motor may be controlled based on the command driving force or the like. When the vehicle body vibration control device of the present invention is applied to an electric vehicle, an output of an electric motor may be controlled based on the command driving force or the like.

In particular, when the vehicle body vibration control device of the present invention is applied to the vehicle having a hybrid system mounted thereon or to the electric vehicle, torque of the electric motor is lowered along with increase of the revolution speed thereof, and thus the notch degree may be set lower as the vehicle speed is higher.

In the above-mentioned embodiment, the vehicle is the rear-wheel-drive vehicle. However, the vehicle body vibration control device of the present invention may be applied to a front-wheel-drive vehicle and a four-wheel-drive vehicle.

The invention claimed is:

1. A vehicle body vibration control device for a vehicle, comprising:
    a request driving force calculation unit configured to calculate a request driving force of a driver;
    a driving unit configured to apply a driving force to the vehicle;
    a driving force control unit configured to control said driving unit based on a command driving force;
    a notch filter configured to receive a signal indicating the request driving force from said request driving force calculation unit, subject the signal to filter processing, and output the signal subjected to the filter processing to said driving force control unit as a signal indicating the command driving force, said notch filter having a notch frequency set to a value for reducing a frequency component of vibration of a vehicle body; and
    a command driving force correction unit configured to correct, when the driver performs any one of a predetermined shifting operation and a predetermined changing operation for a vehicle traveling mode, the command driving force to a value closer to the request driving force of the driver than to the command driving force.

2. A vehicle body vibration control device for a vehicle according to claim 1, wherein said command driving force correction unit is configured to correct the command driving force to the request driving force of the driver.

3. A vehicle body vibration control device for a vehicle according to claim 1, wherein said predetermined shifting operation comprises a shifting operation to be performed between a shift position where the driving force is applied to the vehicle and a shift position where no driving force is applied to the vehicle.

4. A vehicle body vibration control device for a vehicle according to claim 1, wherein said predetermined changing operation for the vehicle traveling mode comprises a changing operation for the vehicle traveling mode, which involves a change of responsiveness of the driving force of the vehicle to a driving operation performed by the driver.

5. A vehicle body vibration control device for a vehicle according to claim 2, wherein said predetermined shifting operation comprises a shifting operation to be performed between a shift position where the driving force is applied to the vehicle and a shift position where no driving force is applied to the vehicle.

6. A vehicle body vibration control device for a vehicle according to claim 2, wherein said predetermined changing operation for the vehicle traveling mode comprises a changing operation for the vehicle traveling mode, which involves a change of responsiveness of the driving force of the vehicle to a driving operation performed by the driver.

* * * * *